United States Patent Office 3,190,852
Patented June 22, 1965

3,190,852
POLYOLEFINS STABILIZED WITH A COMBINATION OF DIALKYL THIODIPROPIONATES AND POLYPHENOLS
Marshall E. Doyle, Lafayette, Calif., assignor to Shell Oil Company, New York, N.Y., a corporation of Delaware
No Drawing. Filed July 31, 1962, Ser. No. 213,605
2 Claims. (Cl. 260—45.85)

This invention relates to stabilized polymers of alpha-monoolefins. More particularly, it relates to stabilized compositions and methods for stabilizing polymers of alpha-monoolefins prepared at low temperatures and pressures.

It is now well known that polymers of alpha-monoolefins can be prepared at low temperatures and pressures in the presence of certain catalyst compositions which are commonly referred to as "Ziegler-type catalysts," "low-pressure catalysts," or "coordination catalysts." Polymers produced by use of these catalysts are characterized by a high degree of regularity of their molecules and are termed isotactic, stereoregular, crystallizable, crystalline, linear, low pressure, or "Ziegler" polymers.

A particularly useful low-pressure polymer is highly crystalline or crystallizable polypropylene. It is characterized, among other things, by a high melting point, i.e., in the order of about 170° C. and improved tensile strength. Although there are various ways of distinguishing this polypropylene from the prior art amorphous type of polypropylene, it is convenient to characterize the crystalline polymer by the proportion of polymer which is insoluble in boiling heptane, amorphous polypropylene being soluble therein. Low-pressure polypropylene prepared with preferred Ziegler type catalysts contains as much as 90 to 98% heptane insoluble polymer.

Linear polyolefins prepared with the use of Ziegler-type catalysts generally show a gradual degradation when processed or stored. Degradation occurs particularly during exposure to elevated temperatures, such as may occur in milling, molding, or extrusion, and during prolonged exposure to light, such as may occur during use. The effect of such degradation is to render the polymers brittle and inflexible and to lower their tensile strength, thus reducing their usefulness for most applications.

The stabilization to which this invention relates consists in the incorporation of a combination of compounds which act as stabilizers suppressing undesired degradation and consequent changes in properties of polyolefins. Several modifications of this invention will be described which provide stabilization of varying scope and among which a selection can be made to select stabilization which provides a particular desired degree of protection.

Various substances which are known to give satisfactory results as stabilizers for polymers obtained by high pressure polymerization with a peroxide catalyst have been found to be unsatisfactory in the case of low pressure, linear polyolefins. One of the major differences between high pressure polymers and low pressure polymers is that the latter almost invariably contain significant traces of metallic catalysts. These catalyst residues can interact with some stabilizers to produce colored products or other undesirable effects.

A series of novel stabilizers for polyolefins have been recently described in U.S. 3,053,803, to Jaffe et al., U.S. 3,026,264 to Rocklin et al., U.S. 3,062,895 to Martin et al., and U.S. 3,047,503 to Jaffe et al. The stabilizers of this series are polyphenols which are characterized by the fact that they contain at least one benzene ring on which there is substituted at least one 3,5-dialkyl-4-hydroxybenzyl radical. The compounds are described below in greater detail. This series of novel stabilizers includes outstandingly good stabilizers for linear polypropylene. The preferred compounds of the series are sufficient to stabilize polypropylene or similar polyolefins against thermal degradation even when used alone in relatively low concentration.

However, it is sometimes desirable to reduce the amount of the polyphenol stabilizer below that which would provide sufficient stabilization when used alone, e.g., to reduce the total cost of stabilization.

It has now been found that a group of materials which are by themselves very inefficient as stabilizers of polyolefins enhance the effectiveness of said polyphenyl stabilizers to such an extent that much lower amounts of the polyphenolic stabilizers can be employed to provide a desired degree of protection.

Among the objects of the invention are: to provide novel compositions of polymers of alpha-monoolefins; to provide stabilized compositions of polymers of alpha-monoolefins; to provide polymers of alpha-monoolefins which have color stability and which have improved resistance to embrittlement; to provide methods for stabilizing linear or crystalline polypropylene and other polyolefins and to provide a method for substantially reducing or preventing the tendency of polyolefins to degrade during processing operations such as are carried out during the manufacture of articles therefrom, and also during the subsequent lifetime of such articles.

The inhibitor systems of this invention are useful in linear polymers of olefins of from 2 to 8 carbon atoms per molecule, including ethylene, butene-1, 4-methylpentene-1 and hexene-1 and in crystalline copolymers of propylene with ethylene, butene-1 and the like and block copolymers of alpha olefins. The term "polymers of alpha-monoolefins" as used in this specification denotes only those polymers formed from alpha-monoolefin hydrocarbon feeds, and thereby excludes polymers formed from non-olefinic monomers, polymers and/or copolymers. While this invention thus applies to polymers of various alpha-monoolefins, the description is directed mainly to polypropylene. It has been found that polypropylene is particularly readily attacked and degraded during heating and processing and that inhibitor systems which are satisfactory in other polyolefins may not be satisfactory in polypropylene. On the other hand, inhibitor systems satisfactory in polypropylene will usually also be satisfactory in other low-pressure polymers.

The combination of stabilizing compounds which is incorporated in a linear polyolefin to provide the novel compositions of this invention consists of (1) one of certain polyphenols characterized by the presence of at least one benzene ring on which there is substituted at least one 3,5-dialkyl-4-hydroxybenzyl group; and (2) one of certain organic sulfides and polysulfides. The compounds which are useful stabilizers in accordance with this invention are described and illustrated in further detail hereinafter.

Reactants, catalysts, and conditions useful in the production of Ziegler type low-pressure polyolefins are known in prior art. Early references are, for example, Belgian Patents Numbers 534,792 and 538,782 to Ziegler and Ziegler et al., respectively. A great variety of suitable catalysts and conditions for their use have since been described. Suitable catalysts can be selected from the references listed on pages 350–361 of "Linear and Stereoregular Addition Polymers," by Gaylord and Mark, Interscience Publishers, Inc., New York, 1959. Catalysts which are particularly suitable for production of highly crystalline polypropylene, and their use, are described in U.S. Patent 2,971,925 to Winkler et al.

In general, suitable coordination catalysts comprise the reaction product of (1) a compound of a transition metal selected from the metals in subgroups "a" of groups IV, V and VI and from group VIII metals of the Mendeleev Periodic Table as illustrated on page 28 of Ephraim, "Inorganic Chemistry," 6th English edition, with a reducing compound which is generally a hydride or a metal-organic compound of a metal from groups I–III of the Periodic Table.

The preferred transition metals whose compounds are used for producing various types of low-pressure polymers are titanium, vanadium and chromium. Titanium trichloride is a particularly preferred compound. Other suitable metals include zirconium, hafnium, tellurium, columbium, tantalum, molybdenum, cobalt, and nickel. The preferred reducing compounds are aluminum alkyls, particularly aluminum trialkyls and dialkyl aluminum halides. Lower alkyl groups, such as ethyl, isopropyl and isobutyl are preferred. The preferred halogen element is chlorine.

The novel polyphenols to be used in compositions according to this invention can be generally described by Formula I

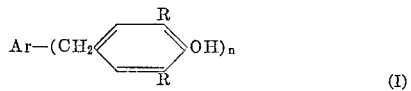

(I)

wherein Ar is an aryl group further defined below, $n$ is an integer further defined below, and R is an alkyl radical, preferably one having up to eight carbon atoms. Since compounds having hindered phenolic groups are most satisfactory as stabilizers, it is preferred that at least one, and most preferably both, of the alkyl substituents R have from 3 to 8 carbon atoms and be branched on the alpha carbon atom.

In the compounds of U.S. 3,053,803, $n$ of Formula I is an integer from 1 to 3 and the aryl group Ar of Formula I is preferably a phenol ring II

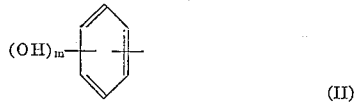

(II)

in which $m$ is an integer from 1 to 3; it may also be a naphthol group, or it may be a polynuclear polyphenol group III

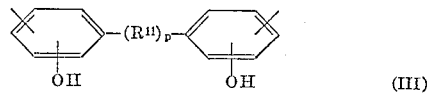

(III)

wherein $R^{11}$ is a lower alkylene radical, $p$ is an integer from 0 to 1, and the preferred value of $n$ is 2. The hydroxyl-containing six carbon rings of aryl groups II or II may also contain alkyl group substituents.

In the compounds of U.S. 3,026,264, the aryl group Ar of Formula I is represented by the formula

(IV)

In these compounds, the value of $n$ in Formula I is always 3. Each $R^{111}$ is an alkyl radical, preferably one having from 1 to 8 carbon atoms. Methyl or ethyl groups are suitable. The symmetrical hexa substituted benzenes, in which alkyl groups $R^{111}$ are in the 1, 3, and 5 position, are most effective as stabilizers, as well as being the easiest to prepare.

In the compounds of U.S. 3,062,895, the aryl group Ar of Formula I is represented by the formula

(V)

Less preferred, compounds in which Ar represents

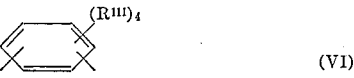

(VI)

may also be used. The value of $n$ in formula I is always 2 for these substituted tetraalkylbenzene compounds.

In the compounds of U.S. 3,047,503 the aryl group Ar of Formula I is a polycyclic hydrocarbon aromatic nucleus, i.e., a fused ring system which has more than one six-membered aromatic ring, but which does not contain an atomic bridge, a crossed valence bridge, or a free spiro union. Systems having two to four rings are preferred. The value of $n$ in Formula I, for these compounds, is 4 when Ar is naphthalene and 6 when Ar is anthracene or phenanthrene, i.e., it is twice the number of fused rings. The polycyclic aromatic nucleus may be substituted with other hydrocarbon radicals, particularly lower alkyl radicals.

Numerous individual compounds which meet these definitions are named and illustrated in said patents and applications. The following compounds serve to illustrate those which are preferred for use in this invention.

Those polyhenols in which a benzene ring contains three symmetrically spaced 3,5-di-tert-alkyl-4-hydroxybenzyl groups, the other three positions being filled by alkyl or hydroxyl group, are generally superior inhibitors when used alone. When used with the described sulfur compounds, the combinations have the advantage that only very low concentrations of the polyphenol are needed to provide the desired protection.

The most preferred phenolic compounds have a fully substituted benzene nucleus, three substituents being 3,5-di-tert-butyl-4-hydroxybenzyl radicals and the remaining substituents being methyl or hydroxy groups. Especially useful results are obtained when the polyphenolic compound is 1,3,5-trimethyl-2,4,6-tri(3,5-di-tert-butyl-4-hydroxylbenzyl) benzene.

Another very useful compound is 1,4-bis(3,5-di-tert-butyl-4-hydroxylbenzyl)tetramethylbenzene.

Still another useful group of compounds are those in which the substituted benzene nucleus contains at least one hydroxyl group, particularly 2,4,6-tri(3,5-di-tert-butyl-4 - hydroxybenzyl)phenol; 3,3¹,5,5¹ - tetra(3,5 - di - tert-butyl-4-hydroxybenzyl)-4-dihydroxybiphenol; 2,2-bis[3,5-di(3,5 - di - tert-butyl-4-hydroxybenzyl)-4-hydroxyphenyl] propane; and 2,4,6-tri(3,5-di-tert-butyl-4-hydroxybenzyl)-3,5-dimethylphenol.

The sulfur-containing component of the stabilizing compositions of this invention is characterized by a

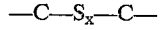

linkage in which S is an integer of at least 1, preferably 1 or 2 and most preferably 1, and the carbon atoms are members of hydrocarbon groups or of acid residues of lower carboxylic acid esters of higher alcohols.

The hydrocarbon esters of thiodialkanoic acids which are useful according to this invention may be represented by the formula:

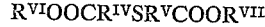

wherein $R^{IV}$ and $R^V$ are similar or dissimilar divalent aliphatic hydrocarbon radicals having from 1 to 6, preferably not more than 4 and most preferably 2 carbon atoms, and $R^{VI}$ and $R^{VII}$ are preferably alkyl groups, but may be cycloalkyl or arylalkyl groups. $R^{VI}$ and $R^{VII}$ are preferably normal alkyl groups of 10 to 20 carbon atoms and most preferably identical groups of 12 to 18 carbon atoms each. Very good results are obtained with compounds which are the esters of betathiodipropionic acid and monohydric alcohols of 10 to 20 carbon atoms, and particularly with the dialkyl esters. It is advisable for the hydrocarbon groups to be such that the boiling point of the compound exceeds 250° C.

The preferred ester for use in this invention, dilauryl beta-thiodipropionate, is well known and is commercially available. Methods are known for preparing various esters of the same general type in which other hydrocarbon groups are present, both in the acid radical and in the combined alcohol radical.

The hydrocarbon sulfides which are useful according to this invention are those having from 12 to 50 carbon atoms per molecule and having the general formula $R_1-S_x-R_2$, wherein $x$ is an integer and $R_1$ and $R_2$ represent similar or dissimilar hydrocarbon radicals.

In two preferred modifications of this invention, the sulfur compound is a dialkyl monosulfide having at least 30 carbon atoms per molecule or a dialkyl disulfide having at least 24 carbon atoms per molecule. Some improvement is obtained with monosulfides having as few as 18 carbon atoms per molecule or disulfides having at least 12 carbon atoms per molecule, but the stabilization obtained improves drastically as the number of carbon atoms in the molecule increases above these minima. Sulfides having from 24 to 40 carbon atoms per molecule are particularly preferred. The preferred alkyl groups are normal or only slightly branched alkyls.

Useful improvements in stabilization can be obtained with a variety of compounds. These include dialkyl monosulfides having at least 18 carbon atoms per molecule, mixed alkyl aryl monosulfides having at least 18 carbon atoms per molecule, diaryl sulfides having at least 18 carbon atoms per molecule, alkyl cycloalkyl sulfides having at least 18 carbon atoms per molecule, dicycloalkyl sulfides having at least 18 carbon atoms per molecule and the corresponding disulfides or other polysulfides of at least 12 carbon atoms per molecule. The hydrocarbyl groups are so well known as to make a recitation of individual compounds of the above types superfluous.

$R_1$ and $R_2$ may also be connected together as part of a single ring, as in thiophene and alkyl derivatives thereof.

Another suitable group of sulfides are the dialkyl xanthogene disulfides (RO.CS.SS.SC.OR) in which the total sum of carbon atoms is at least 12, e.g., dicetyl xanthogene disulfide.

Polymeric products of the type polyalkoxy alkylsulfide $(-R_1-O-R_1-S-)_x$, polyalkoxy alkoxy-alkyl sulfide $(-R_1-O-R_2-O-R_1-S-)_x$, or polyhydroxy alkylsulfide $(-R_1(OH)-S-)_x$, as described in detail in the German published patent application 1,048,022 are also representative of sulfides according to the invention.

The sulfides forming part of the new system of stabilizers may sometimes also be formed in situ. Thus, for example, disulfides may be formed from mercaptans under alkaline conditions in the presence of oxygen.

The concentrations in which the stabilizers of this invention are used are generally between 0.001 and 2% by weight of combined stabilizers. The total amount of stabilizer and the amount of each stabilizing component which is used depend on several factors, such as the type and degree of purity of the substrate, the conditions selected for incorporating stabilizer, the expected conditions during subsequent treatment and use of the stabilized polymer, and the like. The most effective polyphenols are used in concentrations of at least 0.005%, and most polyphenols are used in concentrations in the range from 0.05 to 0.5%. While the sulfur compounds may be used with some effect in concentrations as low as one-tenth of the polyphenol concentration by weight, the preferred weight ratios of sulfur compound to polyphenol are from 0.5:1 to 10:1. Ratios between about 1:1 and 5:1 are especially preferred. The sulfur compounds are generally used in concentrations in the range from 0.05 and preferably from 0.1 to 0.5% by weight. Preferred total concentrations of combined polyphenol and sulfur compound are in the range from 0.1 to 0.6 percent by weight for the preferred, more effective stabilizers. Percentages are expressed as based on the weight of polymer.

The stabilizers of this invention may be employed with many other additives commonly used in polymer formulations without any adverse effects resulting therefrom. Typical of such additives are fillers, pigments and dyes.

The stabilizers of this invention are easily incorporated into the polymer formulations by any known blending technique, such as dry blending and milling. In a preferred method of adding stabilizers, at least one of the stabilizing components is added in the earliest possible stage, e.g., by adding it prior to the separation of polymer from the reaction mixture.

If desired, the combination of two or more representatives of each of the two groups of stabilizers to be used according to this invention may be employed.

The invention is further explained by means of the following examples. These examples are for illustrative purposes only and are not to be considered a limitation of the invention.

For convenience of reference, the stabilizing compounds are identified in the examples by letters, as follows:

A—1,3,5-trimethyl-2,4,6-tri(3,5-di-tert-butyl-4-hydroxybenzyl)benzene
B—1,4-bis(3,5-di-tert-butyl-4-hydroxybenzyl)tetramethyl-benzene
C—9,10-bis(3,5-di-tert-butyl-4-hydroxybenzyl)anthracene
D—2,4,6-tri(3,5-di-tert-butyl-4-hydroxybenzyl)3,5-dimethyl phenol
E—1,2,4-triethyl-3,5,6-tri(3,5-diisopropyl-4-hydroxybenzyl) benzene
F—1,2-dimethyl-5-ethyl-3,4,6-tri(3-amyl-5-tert-butyl-4-hydroxybenzyl) benzene
G—1,4-bis(3-tert-butyl-5-methyl-2-hydroxybenzyl)-tetramethyl-benzene
H—3,3¹,5,5¹-tetra(3,5-di-tert-butyl-4-hydroxybenzyl)-4-dihydroxybiphenol
I—2,2-bis[3,5-di(3,5-di-tert-butyl-4-hydroxybenzyl)-4-hydroxyphenyl]propane
J—2,6-di(3,5-di-tert-butyl-4-hydroxybenzyl) phenol
K—Dilauryl thiodipropionate
L—Di-n-hexadecyl sulfide
M—Di-n-dodecyl-thiodipropionate
N—Di-n-octadecyl-thiodipropionate
O—Di-n-eicosyl sulfide
P—n-Dodecyl-n-cetyl sulfide
Q—n-Dodecyl phenyl sulfide
R—Didodecyl disulfide
S—Polymer from dialkyl ether and hydrogen sulfide according to German DAS 1,048,022

EXAMPLE 1

Polypropylene employed is of the type prepared with the use of a catalyst composed of titanium trichloride and aluminum diethyl chloride in which the titanium trichloride is prepared by reacting titanium tetrachloride with a stoichiometric equivalent of aluminum triethyl. The polypropylene has an intrinsic viscosity of about 3.1 dl./g. measured at 150° C. in decalin, and contains 0.4 phr. calcium stearate.

*Testing after heating in air*

Individual samples of polymer powder are mixed with different proportions and types of stabilizers and milled for a few minutes at 180° C. 0.5 mm. thick sheets are pressed from the hide at 230° C. These sheets are kept at 135° C. while exposed to the atmosphere, and periodically tested for brittleness.

The stabilizers employed in these tests, in the specified amounts, are several different polyphenols and organic sulfides, alone and in combination. Results are given in Table 1.

TABLE 1

| Polyphenol Compound | Concentration, phr. | Sulfur Compound | Concentration, phr. | Number of Days to Brittleness |
|---|---|---|---|---|
| None | | None | | <1 |
| None | | K | 0.3 | <3 |
| None | | L | 0.3 | <3 |
| A | 0.03 | None | | 15 |
| A | 0.03 | K | 0.1 | 69 |
| A | 0.03 | K | 0.2 | 93 |
| A | 0.03 | K | 0.3 | 105 |
| A | 0.05 | None | | 36 |
| A | 0.05 | K | 0.1 | 94 |
| A | 0.05 | K | 0.3 | 131 |
| A | 0.15 | None | | 80 |
| A | 0.15 | K | 0.3 | 165 |
| A | 0.15 | L | 0.3 | 143 |
| B | 0.05 | None | | 20 |
| B | 0.05 | K | 0.1 | 68 |
| B | 0.05 | K | 0.3 | 85 |
| B | 0.05 | L | 0.1 | 73 |
| B | 0.05 | L | 0.3 | 80 |
| B | 0.15 | None | | 70 |
| B | 0.15 | K | 0.3 | 105 |
| B | 0.15 | L | 0.3 | 130 |

EXAMPLE 2

A similar series of tests is carried out with polyphenols B, C, and D in a different polypropylene substrate, namely, a commercial product having an intrinsic viscosity of 2.7, prepared with a titanium trihalide-aluminum alkyl halide catalyst and believed to be free of stabilizers other than those specified. Catalyst residue impurities present in the polymer are of the order of 100 p.p.m. aluminum, 200 p.p.m. titanium, and 50 p.p.m. chlorine.

A further test with polyphenol A is carried out in a similar polypropylene substrate whose intrinsic viscosity is 2.3 and whose catalyst residue content is about 40 p.p.m. aluminum, 85 p.p.m. titanium, and 150 p.p.m. chlorine Polymer is milled for 5 minutes at 190° C with various proportions of various stabilizers. Films of 5 mil (0.005 inch) thickness are pressed from the milled product at 235° C. These films are held at 133° C. in an air-circulating oven, and periodically tested for brittleness. Results are given in Table 2.

TABLE 2

| Polyphenol Compound | Concentration, phr. | Sulfide Compound | Concentration, phr. | Number of Days to Brittleness |
|---|---|---|---|---|
| None | | None | | <1 |
| None | | K | 0.3 | <3 |
| None | | L | 0.3 | <3 |
| A | 0.25 | None | | 43 |
| A | 0.25 | K | 0.25 | 72 |
| A | 0.25 | L | 0.25 | 56 |
| B | 0.25 | None | | 6 |
| B | 0.25 | K | 0.25 | 16 |
| C | 0.25 | None | | 4 |
| C | 0.25 | K | 0.25 | 8 |
| D | 0.25 | None | | 22 |
| D | 0.25 | K | 0.25 | 30 |

EXAMPLE 3

When inhibited polypropylene is exposed in an oxygen atmosphere at 135° and 160° C. and oxygen uptake observed, it is found that the end of the period of effectiveness of antioxidant is shown by a change in rate of oxygen uptake. The length of this induction period (I.P.) is a measure of antioxidant effectiveness. For a combination of two stabilizers, I and II, a "synergism factor" can be calculated from the data as $$\frac{I.P._{I+II}}{I.P._{I}+I.P._{II}}$$

For a combination of antioxidants A and L at a weight ratio of L:A of 3.7:1 and a total concentration of 0.61% by wt., the synergism factor is found to be 12.6. At a weight ratio of 2.6:1 and a total concentration of 0.39 the synergism factor is 10.3.

EXAMPLE 4

Samples of linear polypropylene are inhibited with equal parts of several combinations of inhibitors, the total concentration of combined inhibitor in each sample being between 0.2 and 0.6 percent by weight of the polymer. Combinations of polyphenol B with sulfur compounds O, P, Q, R, and S, of sulfur compound K with polyphenols E, F, G, H, I, and J and of sulfur compound L with polyphenols E, F, G, H, I, and J, when tested according to Example 1, show these combinations to provide greater antioxidant protection than the additive effects of the separate components.

The combinations of Examples 1–4 also provide satisfactory stabilization of polyethylene and of polymers of high alpha-monoolefins such as poly-4-methyl-1-butene produced with a Ziegler catalyst and of block copolymers of polypropylene with small amounts of other olefins.

It will be understood, and it is illustrated by the examples, that some of the polyphenolic inhibitors and some of the sulfides are superior to others and not all combinations provide equally good results.

I claim as my invention:
1. Stabilized polypropylene composition comprising
  (I) solid polymer consisting substantially of propylene produced by a low-pressure polymerization process and containing residue of a group IV metal compound, combined with
  (II) up to 1 percent by weight of an inhibitor against thermal degradation thereof, consisting of a synergistic combination of
    (1) at least 0.05 percent by weight of a dialkyl beta-thiodipropionate wherein the alkyl group contains from 12 to 18 carbon atoms, and
    (2) at least 0.05 percent by weight of 1,3,5-trimethyl-2,4,6-tri-(3,5-di-tert - butyl - 4 - hydroxybenzyl)benzene,
      said compounds (1) and (2) being present in a ratio in the range from 1:1 to 5:1, and said percentages being based on the weight of polypropylene.

2. Stabilized polypropylene composition comprising
  (I) solid polymer consisting substantially of polypropylene produced by a low-pressure polymerization process and containing residue of a group IV metal compound, combined with
  (II) up to 1 percent by weight of an inhibitor against thermal degradation thereof, consisting of a synergistic combination of
    (1) at least 0.05 percent by weight of dilauryl beta-thiodiproponate, and
    (2) at least 0.05 percent by weight of 1,3,5-trimethyl-2,4,6-tri(3,5-di-tert - butyl - 4 - hydroxybenzyl)benzene,
      said compounds (1) and (2) being present in a ratio in the range from 1:1 to 5:1, and said percentages being based on the weight of polypropylene.

References Cited by the Examiner

UNITED STATES PATENTS 2,519,755    8/50    Gribbins et al. _____ 260—45.85
2,563,835    8/51    Gribbins et al. _____ 260—45.85

| | | UNITED STATES PATENTS | |
|---|---|---|---|
| 2,564,106 | 8/51 | Gribbins et al. | 260—45.85 |
| 2,889,295 | 6/59 | Darby et al. | 260—45.85 |
| 2,947,721 | 8/60 | Newland et al. | 260—45.95 |
| 2,964,495 | 12/60 | Newland et al. | 260—45.95 |
| 2,964,497 | 12/60 | Kibler et al. | 260—45.75 |
| 2,965,606 | 12/60 | Watchung et al. | 260—45.75 |
| 2,967,847 | 1/61 | Hawkins et al. | 260—45.7 |
| 2,967,850 | 1/61 | Hawkins et al. | 260—45.7 |
| 3,026,264 | 3/62 | Rocklin et al. | 260—45.95 |
| 3,033,814 | 5/62 | Tholstrup | 260—45.85 |
| 3,047,503 | 7/62 | Jaffe et al. | 260—45.95 |
| 3,053,803 | 9/62 | Jaffe et al. | 260—45.95 |
| 3,062,895 | 11/62 | Martin et al. | 260—45.95 |

FOREIGN PATENTS

| 658,288 | 2/63 | Canada. |
|---|---|---|
| 929,435 | 6/63 | Great Britain. |
| 587,296 | 5/60 | Belgium. |

OTHER REFERENCES

Sun Oil Co., 587,296 (Belgian) May 30, 1960, abstracted in Derwent Belgian Patent Reports, vol 66A, July 15, 1960.

Neureiter et al.: "Synergism Between Phenols and Sulfides" in Industrial Eng. Chem. Prod. Research and Development, vol. 1, No. 4; pages 236–241, December 1962.

LEON J. BERCOVITZ, *Primary Examiner.*

DONALD E. CZAJA, *Examiner.*